Aug. 8, 1950
J. H. KEEGAN ET AL
2,518,332
ELECTRICAL CONTROL INSTRUMENT
Filed Aug. 31, 1946
2 Sheets-Sheet 1
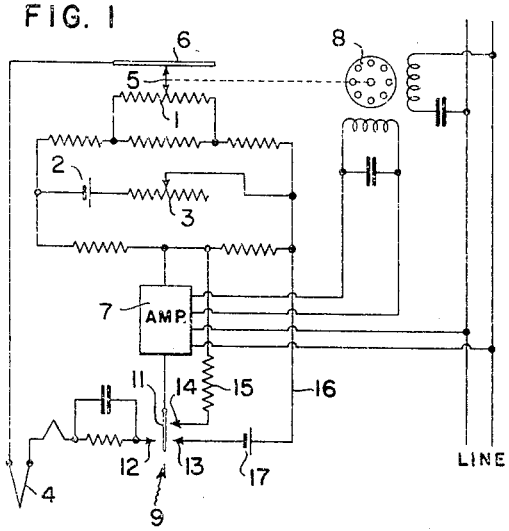
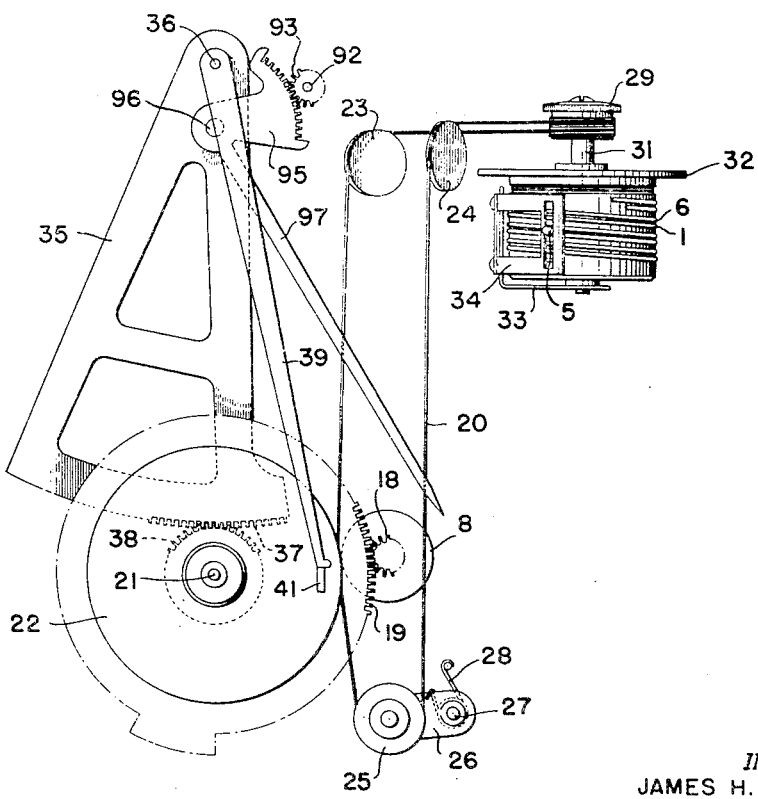
INVENTORS.
JAMES H. KEEGAN
DONALD P. ECKMAN
BY E. Wellford Mason
ATTORNEY.

Aug. 8, 1950

J. H. KEEGAN ET AL 2,518,332

ELECTRICAL CONTROL INSTRUMENT

Filed Aug. 31, 1946

INVENTORS.
JAMES H. KEEGAN
DONALD P. ECKMAN

BY

*E. Wellford Mason*

ATTORNEY.

Patented Aug. 8, 1950

2,518,332

UNITED STATES PATENT OFFICE 2,518,332

ELECTRICAL CONTROL INSTRUMENT

James H. Keegan and Donald P. Eckman, Philadelphia, Pa., assignors, by mesne assignments, to Minneapolis-Honeywell Regulator Company, Minneapolis, Minn., a corporation of Delaware Application August 31, 1946, Serial No. 694,404

9 Claims. (Cl. 201—48)

The present invention relates to control instruments, and more particularly to a means for moving one element of a control system with respect to another element thereof in response to variations in a condition under control.

In control systems using an electrical bridge network, or a so-called proportioning system, there is provided in the control instrument a resistance element. A contact is adjusted along this resistance element in response to changes in the value under measurement and control. In this case the condition is described, by way of example only, as being temperature. In response to relative movement of the contact and resistance the bridge circuit is unbalanced and a relay is operated in one direction or an opposite direction to energize a motor connected to a condition regulating device. As this motor rotates it also relatively adjusts a second contact relative to a second resistance to rebalance the electrical network.

The construction of the present invention is adapted to be used with various types of measuring instruments, but is particularly adapted for use with self-balancing potentiometers, and will be described in connection with an instrument of that type. As is well known, potentiometric instruments are provided with a part that is moved to positions corresponding to the value of the temperature under measurement and control. This part is connected mechanically in this case to the contact of the bridge circuit so that as the part is moved the contact is moved over the resistance. Provision is also made to shift the normal position of the resistance and contact relative to a given position of the part so that the bridge network is balanced at various positions of the part. In this way the control point of the instrument is changed so that the temperature under control may be maintained at different values.

It is an object of the invention to provide an accurate and easily adjustable control mechanism to be used in connection with a measuring instrument. It is a further object of the invention to provide a novel arrangement of parts by means of which a contact may be moved relative to a resistance in an electrical control circuit.

It is a further object of the invention to provide a novel arrangement of parts by means of which a contact and resistance forming part of an electrical control system may be mounted on a control instrument. By means of this arrangement the parts are so mounted that there is no lost motion between them and that they may be easily adjusted relative to each other and relative to the instrument.

Attention is called to the copending application of John A. Caldwell et al., Serial Number 694,400, filed on August 31, 1946, that is related to the same subject matter as the present invention. The said copending application discloses a construction that is used in the same combination as the present invention, but shows a construction that is specifically different from that disclosed herein.

The various features of novelty which characterize our invention are pointed out with particularity in the claims annexed to and forming a part of this specification. For a better understanding of the invention, however, its advantages, and specific objects attained with its use, reference should be had to the accompanying drawing and descriptive matter in which we have illustrated and described a preferred embodiment of the invention.

In the drawings:

Figure 1 is a wiring diagram of a potentiometer circuit,

Figure 2 is a diagrammatic view of the construction of various parts of a potentiometer, Figure 3 is a wiring diagram of a simple proportioning control system.

Figure 4:
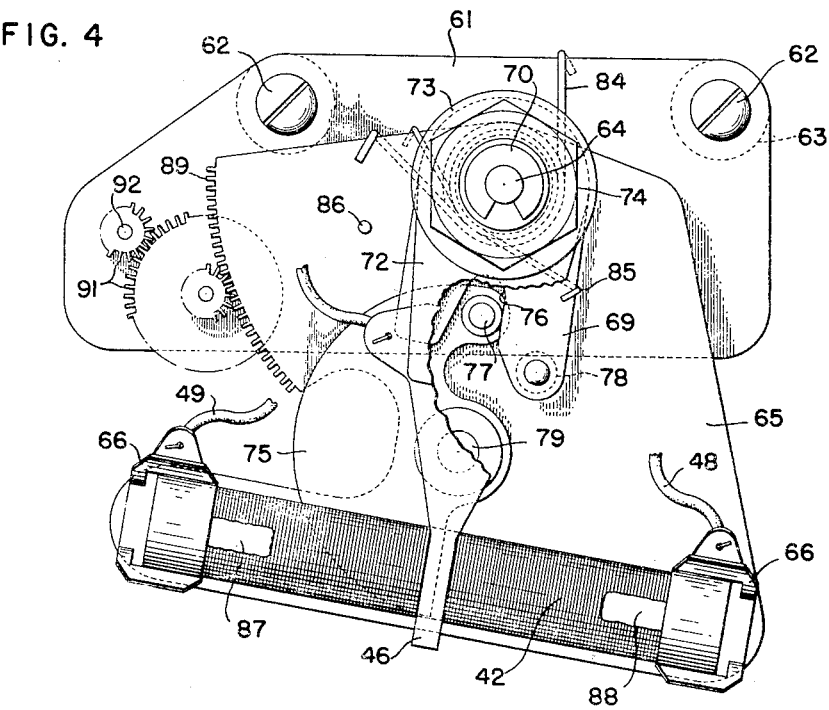
Figure 4 is an enlarged view of the control mechanism.

In Figure 1 there is shown a typical potentiometer circuit in which there is a slide-wire 1 that has a potential impressed across it by a battery 2 to produce a predetermined voltage drop, the battery preferably being in the form of a dry cell. Connected in circuit with the battery is a variable resistance 3 that is used to maintain constant the potential drop in the circuit as the battery diminishes in power in order to maintain the system in calibration. The voltage from a thermocouple 4 is impressed across a portion of the slide-wire 1 as determined by the position of a contact 5 between the slide-wire 1 and a parallel collector bar 6. As the thermocouple E. M. F. changes, due to a temperature change, the potentiometer circuit becomes unbalanced and this in turn is detected by a vibrator and amplifier unit 7 to energize a motor 8 to shift the contact 5 along the slidewire in the proper direction and amount in order to rebalance the potentiometer circuit. The details of the vibrator and amplifier are disclosed in the copending application of Walter P. Wills, Serial No. 421,173, which was filed on December 1, 1941 and which has issued as Patent No. 2,423,540 on July 8, 1917.

The thermocouple is normally connected in the circuit by means of a switch 9 which consists of a movable contact 11 that is directly connected to the amplifier and a stationary contact 12 that is connected to the thermocouple. This switch is also provided with stationary contact 13 that is connected to the potentiometer network, and stationary contact 14, that is used to insert a shunt resistance 15 around the amplifier at such times as the potentiometer circuit is being standardized. In the wire 16 between the contact 13 and the potentiometer network there is located a standard cell 17 which is used to impress a standard potential drop across a portion of the potentiometer network at such times as the network is being recalibrated or standardized.

In the operation of a potentiometer network of the type disclosed above, upon the occurrence of a change in temperature of the thermocouple 4, the potentiometer circuit will be unbalanced to produce a current flow in one direction or the other through the vibrator which is included along with the amplifier and designated as 7. The vibrator and amplifier will detect this unbalance, its direction and amount, and correspondingly energize a motor 8 for rotation in the proper direction. This motor is mechanically connected, in a manner to be described, with the contact 5 so that the latter is shifted along the slide-wire 1 and collector 6 to a position in which the potentiometer circuit is again rebalanced and no current flows through the unit 7.

Due to the fact that the strength of the battery 2 gradually diminishes with use it becomes necessary to adjust the resistance 3 from time to time in order to maintain the calibration of the instrument. At such times as the instrument is to be recalibrated or standardized the movable contact 11 of the switch 9 is shifted to the right to disconnect the thermocouple from the circuit and to insert the standard cell 17 across a portion thereof and to simultaneously insert the shunt 15 around the unit 7. If the circuit needs recalibration a current flow will be produced, producing an energization of the motor 8 to rotate this motor in a direction and an amount proportional to the potentiometer unbalance at that time. This rotation of the motor is used to adjust the amount of the resistance 3 which is inserted in the circuit.

Referring now to Figure 2 it will be seen that motor 8 is provided with a pinion 18 that meshes with a gear 19 which is attached to a shaft 21. As the motor rotates, the gear and shaft will also be rotated to turn a driving pulley 22 which is attached to the shaft 21. A portion of a cable 20 is wrapped around this driving pulley and passes over additional pulleys 23, 24, and 25, the latter of which is mounted on a lever 26 that is pivoted at 27 and biased in a counterclockwise direction by a spring 28 in order to take up any slack that may appear in the cable. The ends of the cable are wrapped around and attached to a driven pulley 29 that is mounted on a shaft 31 which is journaled for rotation in a ceramic or other insulating support 32. This support has wrapped around it in parallel helical relation the slidewire 1 and the collector 6.

A support for the contact 5 is mounted on the lower end of shaft 31 and consists of an angle member 33 which extends beyond the edge of support 32 and upwardly parallel to the side of the same. This member has attached to it a spring 34 that is provided with a slot in which contact 5 is located. Therefore, it will be seen that as the motor 8 rotates it serves, through the cable 20, to drive pulley 29 and support 33, 34 to move contact 5 around the outer edge of the support 32. The contact is held by part 34 in engagement with the slidewire and collector so that as it rotates more or less of the slidewire is inserted in the thermocouple circuit to rebalance the potentiometer as the thermocouple changes in temperature.

Motor 8 also serves to drive a pen which will make a record of the value of the temperature of the thermocouple as the motor rotates. To this end there is provided a sector member 35 that is attached to a shaft 36. This sector member has gear teeth 37 formed on its lower surface which teeth mesh with a pinion 38 that is also attached to shaft 21 and which pinion serves to drive the sector as the pinion is rotated. Pen arm 39, which carries on its lower end a pen 41, is attached to shaft 36 to move with the sector as the latter is driven by the motor 8. The pen 41 is adapted to make a record on a chart (not shown) of the value of the temperature.

It may be assumed that the thermocouple 4 is responsive to the temperature of a heater, the value of which temperature is to be controlled by the potentiometer instrument. To this end, movement of the pen arm shaft 36 in response to changes in temperature is used to adjust a movable element of an electrical bridge circuit of the type known as a proportioning system. Such a system is shown diagrammatically in Figure 3.

The bridge circuit has a resistance 42 which is connected by wires 48 and 49 respectively with a second resistance 45 to complete the bridge. Energizing current is supplied to this bridge from one side of the line by means of a contact 46 that is movable over the resistance 42 and from the other side of the line from a contact 47 that is movable over the resistance 45. Normally speaking the resistance 42 and its contact 46 are located in the instrument, whereas the resistance 45 and its contact 47 are located at a remote point and preferably in the structure of the valve that is to be adjusted in response to temperature changes. Located in the connecting wires 48 and 49 respectively are coils 51 and 52 of a relay mechanism. As one or the other of these coils is energized to a larger extent than the other due to movement of contact 46, the relay will move a contact 53 into engagement with either a contact 54 or a contact 55. These contacts are connected to opposite fields of a reversible motor 56 that is geared in a suitable fashion to a valve 57 that is located in a pipe 58 through which a heat changing medium is supplied. The motor is energized by having another line extend from a junction of the two fields, as is diagrammatically shown, to one side of the line and from the other side of the line through a connection with the contact 53.

In the operation of a bridge circuit of this type, if the bridge is balanced the relay coils 51 and 52 will be equally energized so that contact 53 does not engage either of the contacts 54 or 55. Upon a movement of the contact 46 along resistance 42 in one direction or the other, the bridge will be unbalanced to cause one of the coils 51 or 52 to be energized more than the other. Such operation moves contact 53 into engagement with one or the other of contacts 54 or 55 to energize one field of motor 56. The motor will therefore rotate to adjust the valve 57 in a direction to correct the flow of temperature changing fluid in pipe 58. Simultaneously motor 56 will move contact 47 along resistance 45, in a direction to rebalance the bridge circuit. When the bridge is rebalanced coils 51 and 52 will again be equally energized and the circuit for motor 56 will be broken. The parts will stay in this position until such time as another change in temperature takes place.

Figure 5:
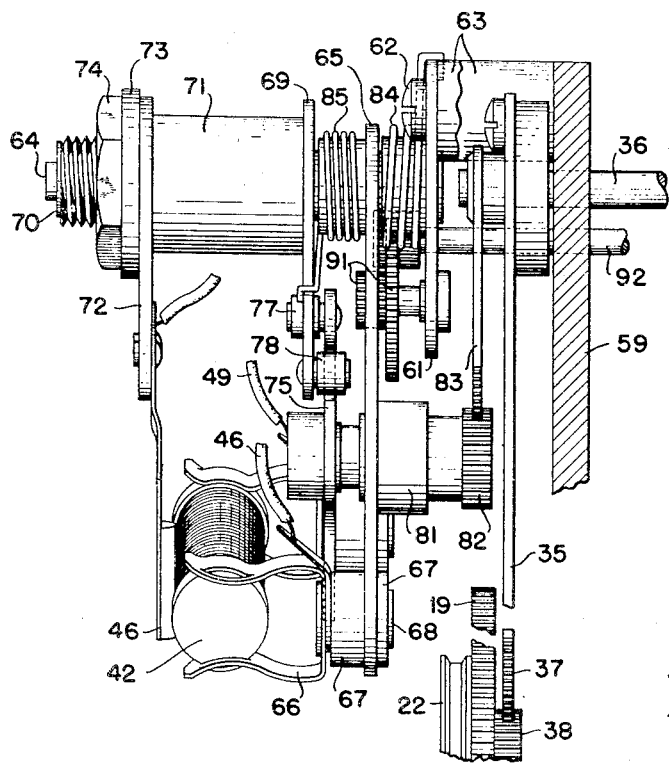
Figure 5 is a view taken from the left of Figure 4 and including part of the supporting mechanism.

The mechanism by which resistance 42 and contact 46 are mounted and moved, and to which the invention is particularly directed, will now be described. As is shown in Figure 5 there is provided a frame 59 upon which parts of the instrument previously described are mounted. Attached to and spaced from the back of this frame is a supporting plate 61 upon which the various control parts are mounted. This plate is held in place on the frame by screws 62 which extend through the plate and through spacing lugs 63 into the frame.

Fastened to plate 61 and projecting to the left therefrom in Figure 5 and coaxial with pen shaft 36 is stud shaft 64 upon which the various parts to be described are mounted. A support 65 for resistance 42 is pivotally mounted upon this shaft as is shown in the drawing. This support has near its lower end a pair of clamps 66 into which the resistance 42 is snapped. The resistance in this case consists of a wire which is wound upon a suitable core, the core being provided at each end with enlargements that are received by the clamps. In order to support the clamps upon the plate and to insulate them therefrom there is provided a block 67 of insulating material on each side of plate 65 through which is passed a small tube 68. This tube is bent over on each end in the manner of a rivet. Thus each tube 68 serves to mount one of the supports 66 and to hold the support and its insulating blocks rigidly in place on plate 65.

Contact 46 is supported for engagement with resistance 42 and for movement therealong by an arm 72 of insulating material. Arm 72 and an actuating arm 69 are fastened to the opposite ends of a sleeve 71 that is rotatable on shaft 64. Arm 72 is held on sleeve 71 by a washer 73 and a nut 74 threaded on the end of the sleeve. Both supporting plate 65 and sleeve 71 are held on shaft 64 by any suitable means such as a cotter 70 that is received in a groove in the shaft.

Arm 69 cooperates with an actuating disc 75 to move contact 46 relative to the resistance. To this end arm 69 is provided with a slot 76 that receives in some positions of member 75 a roller 77 that projects from the surface of the actuating member. Arm 69 is also provided with a roller 78 that is adapted at times to rest upon the surface of the actuating member 75. Actuating member 75 is mounted upon a shaft 79 that is journaled in a bearing 81 which is attached to supporting plate 65. This shaft has on its rear end a pinion 82 which meshes with and is rotated by a segment 83 that is attached to the rear end of pen shaft 36. In order to take up any backlash between the parts, supporting plate 65 is biased in a counterclockwise direction in Figure 4 by a spring 84, and arm 69 is biased in a clockwise direction, with respect to plate 65, by a second spring 85. The clockwise movement of arm 69 is limited by engagement between the left edge of this arm and a stop pin 86 that projects upwardly from the surface of plate 65.

In the operation of the device, plate 65 and resistance 42 carried thereby are normally held stationary in some particular angular position with respect to the frame 59. Then as the pen shaft 36 is rotated in response to changes in the value of the temperature, segment 83 will rotate pinion 82 and actuating member 75 that is mounted for rotation therewith. If, for example, the actuating member is rotated in a clockwise direction in Figure 4 from the position in which it is shown in that figure, roller 77 will bear against the right side of slot 76 to move arm 69 in a counterclockwise direction. This will continue until such time as member 75 has rotated far enough for roller 78 to bear against its surface. This is the limit of rotation of arm 69 and at this time the contact 46 will be at the right end of resistance 42. If the temperature changes in the opposite direction so that actuating member 75 is rotated in a counterclockwise direction in Figure 4, roller 77 will move away from arm 69 and the latter will be moved in a clockwise direction by spring 85 until the arm abuts stop pin 86. This is the limit of movement of contact 46 to the left and at that time the contact will be adjacent the left end of resistance 42. Member 75 may continue rotation in either direction, however, after the contact has reached its limits of movement. The parts are so adjusted that when the temperature under control is at its desired value contact 46 will be in the center of resistance 42. Any deviation from this temperature, regardless of its value, will cause contact 46 to move to one side of its center position.

In order to adjust the control point of the instrument, or the value at which the temperature will be maintained by the apparatus, it is necessary to shift angularly the position of resistance 42 with respect to the pen shaft 36. This is accomplished by rotating plate 65 on its supporting shaft 64. To this end supporting plate 65 is provided on its left edge with gear teeth 89 that mesh with a pinion forming part of a gear train 91 and which ends with another pinion that is attached to a shaft 92. This shaft is journaled for rotation in supporting plate 61 and the frame 59 through both of which it extends. It will be seen that as shaft 92 is rotated, plate 65 will be moved around shaft 64. As this takes place pinion 82 will walk around sector 83 to shift the position of the parts and thereby move contact 46 along resistance 42. Contact 46 can only be brought back to the mid-point of resistance 42 by a change in the temperature to the desired value. When the pen has moved to a position in which contact 46 engages the center of resistance 42 the temperature is again at the control point.

The control point of the instrument is adjusted by rotating shaft 92. Since it is highly desirable for an operator to be able to determine from the front of the instrument where the control point is set, shaft 92 is provided near its front end with a pinion 93 that engages the gear teeth formed on the right edge of a segment 95, as is shown in Figure 2 of the drawing. This segment is pivoted at 96 and is provided with an extension 97 that forms an index which moves over the front of the chart upon which the record is made. Normally the parts will be so proportioned that the calibration mark of the chart to which index 97 is pointing will be the temperature that will be maintained by the instrument. Shaft 92 may be provided with a knob to facilitate its rotation.

The throttling range of the instrument or the amount of variation of the temperature that will be required to move the control valve from its open to its closed position can be changed by varying the length and electrical characteristics of the resistance 42. To this end resistance 42 may be provided with conducting parts 87 and 88 that extend inwardly from its ends toward the center of the resistance. For convenience these parts can be formed of a strip of solder placed on the surface of the resistance. It will be obvious that when contact 46 reaches one or the other of parts 87 and 88, the valve motor will drive the valve to one or the other of its limits.

From the above description it will be seen that we have provided a mechanism by means of which a bridge circuit may be used to control the value of a variable condition. This mechanism is simple and straightforward in its operation. It may be mounted upon a recording instrument with a minimum of difficulty and when so mounted it is accurate and versatile in its adjustment so that it may readily be used with various types of instruments.

While, in accordance with the provisions of the statutes, we have illustrated and described the best form of embodiment of our invention now known to us, it will be apparent to those skilled in the art that changes may be made in the form of the apparatus disclosed without departing from the spirit of our invention as set forth in the appended claims, and that in some cases certain features of our invention may be used to advantage without a corresponding use of other features.

Having now described our invention, what we claim as new and desire to secure by Letters Patent is:

1. In a control instrument, the combination of a resistance, a contact movable across said resistance, a supporting plate for said resistance, a frame member, means to mount said supporting plate on said frame member for pivotal movement around an axis, means to mount said contact on said frame member for pivotal movement around an axis coaxial with the first mentioned axis, and cooperating means carried by said supporting plate and movable with said contact to move said contact across said resistance relative to said frame member.

2. In a control instrument, the combination of a supporting member, a frame member, means to mount said supporting member on said frame member for pivotal movement around an axis, an elongated resistance carried on said supporting member, a contact to engage and move along said resistance, means to mount said contact on said frame member for pivotal movement around an axis coaxial with the first mentioned axis, an arm movable with said contact, an actuating member cooperating with said arm to move it and therefore said contact along said resistance relative to said frame member, means to mount said actuating member for rotation on said supporting member, and means to rotate said actuating member to various positions depending upon the value of a condition under control.

3. In a control instrument, a shaft rotatable to positions corresponding to the value of a condition under control, a supporting member mounted for pivotal movement around an axis coaxial with said shaft, an elongated resistance mounted on said member, a contact operative to move along said resistance, means to mount said contact for pivotal movement around an axis coaxial with said shaft, an actuating part carried by said member, means operated by said shaft as it rotates to rotate said part, and cooperating means between said part and contact to move the latter as said part is rotated whereby said contact is moved to a position along said resistance proportional to the value of the condition.

4. In a control instrument, a shaft rotatable to positions dependent upon the value of a condition, a supporting member mounted for pivotal movement around an axis coaxial with said shaft, an elongated resistance carried by said member, a contact, means to mount said contact for pivotal movement around an axis coaxial with said shaft, an arm movable with said contact, an actuating part rotatable on said member, cooperating means between said arm and part to move said arm and said contact as said part rotates to shift said contact along said resistance, and additional cooperating means between said shaft and said part to rotate said part as either said shaft or said member is rotated.

5. In a control instrument, a supporting member, means to mount said member for pivotal movement around an axis, an elongated resistance mounted on said member, a contact to move along said resistance, means to mount said contact for pivotal movement around an axis coaxial with that of said member, an arm movable with said contact, means to bias said arm and contact for movement in one direction, said arm being formed with a notch therein, a rotating actuating part mounted for rotation on said member, a projection on said part engaging with said notch, whereby upon rotation of said part in a first direction said arm is rotated in said one direction by said biasing means and upon rotation of said part in the opposite direction said projection will engage an edge of said notch and rotate said arm in the opposite direction, and means to rotate said part to positions proportional to the value of a measurable condition.

6. In a control instrument, a supporting member, means to mount said member for pivotal movement around an axis, an elongated resistance mounted on said member, a contact to engage and move along said resistance, means to mount said contact for pivotal movement around an axis coaxial with that of said member, an arm movable with said contact, an actuating part rotatable on said member, cooperating means between said arm and part to move the former by rotation of the latter, means to move said member and the elements carried thereby to various positions dependent upon the value at which it is desired to maintain a condition, and means to rotate said part in any position of said member to various angular positions dependent upon the value of said condition, whereby the relative positions of said contact and resistance will depend jointly upon the value of said condition and the desired value thereof.

7. In a control instrument, the combination of a resistance, a contact movable across said resistance, a supporting plate for said resistance, a frame member, means to mount said supporting plate on said frame member for pivotal movement around an axis, means to mount said contact on said frame member for pivotal movement around an axis coaxial with the first mentioned axis, mechanism adapted, when actuated, to move said supporting plate around said first mentioned axis relative to said frame member, and cooperating means carried by said supporting plate and movable with said contact to move said contact across said resistance relative to said frame member.

8. In a control instrument, the combination of a supporting member, a frame member, means to mount said supporting member on said frame member for pivotal movement around an axis, an elongated resistance carried on said supporting member, a contact to engage and move along said resistance, means to mount said contact on said frame member for pivotal movement around an axis coaxial with the first mentioned axis, mechanism adapted, when actuated, to move said supporting member around said first mentioned axis relative to said frame member, an arm movable with said contact, an actuating member cooperating with said arm to move it and therefore said contact along said resistance relative to said frame member, means to mount said actuating member for rotation on said supporting member, and means to rotate said actuating member to various positions depending upon the value of a condition under control.

9. In a control instrument, the combination of a supporting member, a frame member, means to mount said supporting member on said frame member for pivotal movement around an axis, an elongated resistance mounted on said supporting member, a contact to engage and move along said resistance, means to mount said contact on said frame member for pivotal movement around an axis coaxial with the first mentioned axis, an arm movable with said contact, an actuating part rotatable on said supporting member, cooperating means between said arm and said part to move the former and therefore said contact relative to said frame member by rotation of said part, means to move said supporting member and the elements carried thereby around said first mentioned axis relative to said frame member to various positions dependent upon the value at which it is desired to maintain a condition, and means to rotate said part in any position of said supporting member to various angular positions dependent upon the value of said condition, whereby the relative positions of said contact and said resistance will depend jointly upon the value of said condition and the desired value thereof.

JAMES H. KEEGAN.
DONALD P. ECKMAN.

REFERENCES CITED

The following references are of record in the file of this patent:

UNITED STATES PATENTS

| Number | Name | Date |
|---|---|---|
| 1,821,273 | Pike | Sept. 1, 1931 |